(12) United States Patent
Texier et al.

(10) Patent No.: US 11,623,770 B2
(45) Date of Patent: Apr. 11, 2023

(54) SPACECRAFT ASSEMBLY ARRANGED ABOUT A CENTRAL AXIS AND LINKED ON LONGITUDINAL EDGES BY FASTENERS

(71) Applicant: THALES, Courbevoie (FR)

(72) Inventors: Emmanuel Texier, Cannes la Bocca (FR); Yves Durand, Cannes la Bocca (FR); Jérôme Andy, Cannes la Bocca (FR); Pascal Ribeyron, Cannes la Bocca (FR); Julien Labarthe, Cannes la Bocca (FR)

(73) Assignee: THALES, Courbevoie (FR)

( * ) Notice: Subject to any disclaimer, the term of this patent is extended or adjusted under 35 U.S.C. 154(b) by 268 days.

(21) Appl. No.: 15/734,976

(22) PCT Filed: Jun. 12, 2019

(86) PCT No.: PCT/EP2019/065295
§ 371 (c)(1),
(2) Date: Dec. 3, 2020

(87) PCT Pub. No.: WO2019/238727
PCT Pub. Date: Dec. 19, 2019

(65) Prior Publication Data
US 2021/0229839 A1  Jul. 29, 2021

(30) Foreign Application Priority Data
Jun. 14, 2018  (FR) ........................................ 1800608

(51) Int. Cl.
*B64G 1/64* (2006.01)

(52) U.S. Cl.
CPC ........ *B64G 1/641* (2013.01); *B64G 2001/643* (2013.01)

(58) Field of Classification Search
CPC .................................................. B64G 2001/643
See application file for complete search history.

(56) References Cited

U.S. PATENT DOCUMENTS

| 5,411,226 A | 5/1995 | Jones et al. | |
| 5,605,308 A * | 2/1997 | Quan ...................... | B64G 1/641 244/137.1 |
| 5,613,653 A * | 3/1997 | Bombled ............... | B64G 1/641 244/173.1 |

(Continued)

FOREIGN PATENT DOCUMENTS

| EP | 3 081 496 A1 | 10/2016 |
| FR | 2 717 770 A1 | 9/1995 |
| WO | 2016/176298 A1 | 11/2016 |

*Primary Examiner* — Joseph W Sanderson
(74) *Attorney, Agent, or Firm* — BakerHostetler

(57) ABSTRACT

An assembly includes at least one first collection of a plurality of spacecraft intended to be fastened to a launcher during a launch phase, wherein the spacecraft are arranged about a central axis (Z) in a given transverse plane perpendicular to the central axis, the spacecraft having edges along a longitudinal axis and being moreover arranged in such a way that a spacecraft is linked to a neighboring spacecraft of the collection by one edge by means of at least one fastener (B) positioned on the edge, so as to mechanically hold the spacecraft to one another, and a satellites-launcher adaptor to which the spacecraft are fastened in a transverse plane.

5 Claims, 4 Drawing Sheets

(56) References Cited

U.S. PATENT DOCUMENTS

| | | | | |
|---|---|---|---|---|
| 5,884,866 | A * | 3/1999 | Steinmeyer | B64G 1/222 |
| | | | | 244/137.1 |
| 6,276,639 | B1 * | 8/2001 | Hornung | B64G 1/641 |
| | | | | 244/173.3 |
| 6,357,698 | B1 * | 3/2002 | DiVerde | B64G 1/002 |
| | | | | 244/173.3 |
| 9,718,566 | B2 * | 8/2017 | Field | B64G 1/641 |
| 9,796,488 | B2 * | 10/2017 | Cook | B64G 1/646 |
| 10,407,190 | B2 * | 9/2019 | Fernandez | B64G 1/641 |
| 11,345,489 | B2 * | 5/2022 | Aston | B64G 1/641 |
| 2015/0083865 | A1 * | 3/2015 | Nakasone | B64G 1/007 |
| | | | | 244/158.6 |
| 2016/0304222 | A1 * | 10/2016 | Fernandez | B64G 1/002 |
| 2016/0318635 | A1 * | 11/2016 | Field | B64G 1/641 |
| 2017/0096240 | A1 * | 4/2017 | Cook | B64G 1/646 |
| 2021/0139170 | A1 * | 5/2021 | Davies | B64G 1/66 |

* cited by examiner

SPACECRAFT ASSEMBLY ARRANGED ABOUT A CENTRAL AXIS AND LINKED ON LONGITUDINAL EDGES BY FASTENERS

CROSS-REFERENCE TO RELATED APPLICATIONS

This application is a National Stage of International patent application PCT/EP2019/065295, filed on Jun. 12, 2019, which claims priority to foreign French patent application No. FR 1800608, filed on Jun. 14, 2018, the disclosures of which are incorporated by reference in their entirety.

FIELD OF THE INVENTION

The invention relates to the field of astronautics, and more particularly to the launching of spacecraft such as artificial satellites. More particularly, it relates to a method for arranging a plurality of spacecraft under the cover of a launcher, and to an assembly that can result from such a method.

BACKGROUND

In the context of an aggressive policy of optimization of costs and systems, it is necessary to modify and optimize the usual methods for assembling satellites under the cover of space launchers in order to maximize the space and mass available for the spacecraft.

Usually, arranging satellites within a launcher is done using two solutions:

The first option is to use a central tubular element located along the axis of the cover of the launcher, termed distributor. This tube is mechanically linked to the satellites in order to hold them during launch and in flight using mechanical interfaces. The collection formed of the distributor and the mechanical interfaces provides a rigid assembly. In space, once this assembly has been released from the launcher, pyrotechnic charges, electromechanical coils, shape-memory alloys or paraffin actuators, separate the satellites from the structural distributor. The simplest solution consists in securing a plurality of satellites on a single stage about a central tube.

FIG. 1 shows a prior art distributor (taken from document EP 3081496) that can be accommodated under the cover of a Falcon 9 launcher, with this distributor permitting more efficient use of the space available under the cover. This assembly works only for small satellites, by arranging them in multiple layers about a distributor. This assembly comprises 6 stages of 12 satellites in 2 layers, plus a single-layer stage comprising 4 satellites. This assembly makes it possible to launch up to 76 satellites. Thus, the use of a distributor makes it possible to mechanically hold the satellites on the launcher and to control the sequence of satellite releases. However, there is a substantial financial and logistical cost involved in installing a distributor. Furthermore, the central tube takes up a lot of space that is not converted into payload (satellites) and, on average, the distributor constitutes 10 to 14% of the total launched mass.

It is known from the prior art to adapt the shape and type of non-tubular distributor (see for example U.S. Pat. No. 5,411,226 A) in order to minimize the space taken up by the distributor. However, although the space taken up has been minimized, the mass of the distributor remains substantial and limits the number of satellites that can be launched in one go.

The second option is to stack satellites along the longitudinal axis of the launcher, under the cover. The drawback of this solution is that the mass of the stacked satellites affects the one or more satellites underneath, making it necessary to adapt the design and the structure of these satellites (generally by increasing their mass) in order that they can withstand such a mechanical load. Furthermore, such an arrangement produces a substantial increase in complexity and risk for the satellites' separation sequence. Finally, such an assembly is very often limited to one satellite per level.

SUMMARY OF THE INVENTION

The invention aims to permit more efficient use of the volume available under cover, of the total launched mass and hence to increase the number and/or the mass of satellites that can be launched in one go.

In accordance with the invention, this aim is achieved by arranging the satellites under the cover of a launcher without using a structural distributor.

Thus, the invention relates to an assembly comprising:
at least one first collection of a plurality of spacecraft intended to be fastened to a launcher during a launch phase, characterized in that the spacecraft are arranged about a central axis in a given transverse plane perpendicular to said central axis, said spacecraft having edges along a longitudinal axis and being moreover arranged in such a way that a spacecraft is linked to a neighboring spacecraft by one edge by means of at least one fastener positioned on said edge, so as to mechanically hold said spacecraft to one another,
a satellites-launcher adaptor to which said spacecraft are fastened in a transverse plane. According to particular embodiments of such an assembly:
Said spacecraft are fastened to the launcher via an interface part of the launcher, termed satellites-launcher adaptor, that is adapted according to the number of spacecraft to be assembled.
Said satellites-launcher adaptor is a part having a planar upper portion, on the spacecraft side, and a circular or conical lower portion, on the launcher side.
Said satellites-launcher adaptor is a cylindrical part located below the spacecraft.
Said spacecraft are mounted directly on the launcher and are secured to the launcher and to one another by a strap.
The assembly comprises a central mast that is shared by all the spacecraft serving to control the sequence of release of the spacecraft.
Assembly wherein there are multiple collections of spacecraft arranged about a central axis in a given transverse plane perpendicular to said central axis, said spacecraft having edges along a longitudinal axis and being moreover arranged in such a way that a spacecraft is linked to a neighboring spacecraft by one edge by means of at least one fastener positioned on said edge, so as to mechanically hold said spacecraft to one another, forming layers stacked along the longitudinal axis of the launcher, the layers being linked to one another in a transverse plane of said launcher.

BRIEF DESCRIPTION OF THE DRAWINGS

Other features, details and advantages of the invention will become clear upon reading the description provided with reference to the appended drawings, which are provided by way of example and in which, respectively.

In the following, "longitudinal direction" (or "longitudinal axis") is to be understood as a direction (or, respectively, an axis) that is parallel to the axis of the cover, and hence to the direction of advance of the launcher. A "transverse plane" is to be understood as a plane perpendicular to the axis of the cover (and hence to the longitudinal axis).

The term "spacecraft" can refer to an artificial satellite or any other device intended to move through space, such as an interplanetary probe. In the following, the terms "satellite" and "spacecraft" will be used interchangeably.

DETAILED DESCRIPTION

Figure 1:
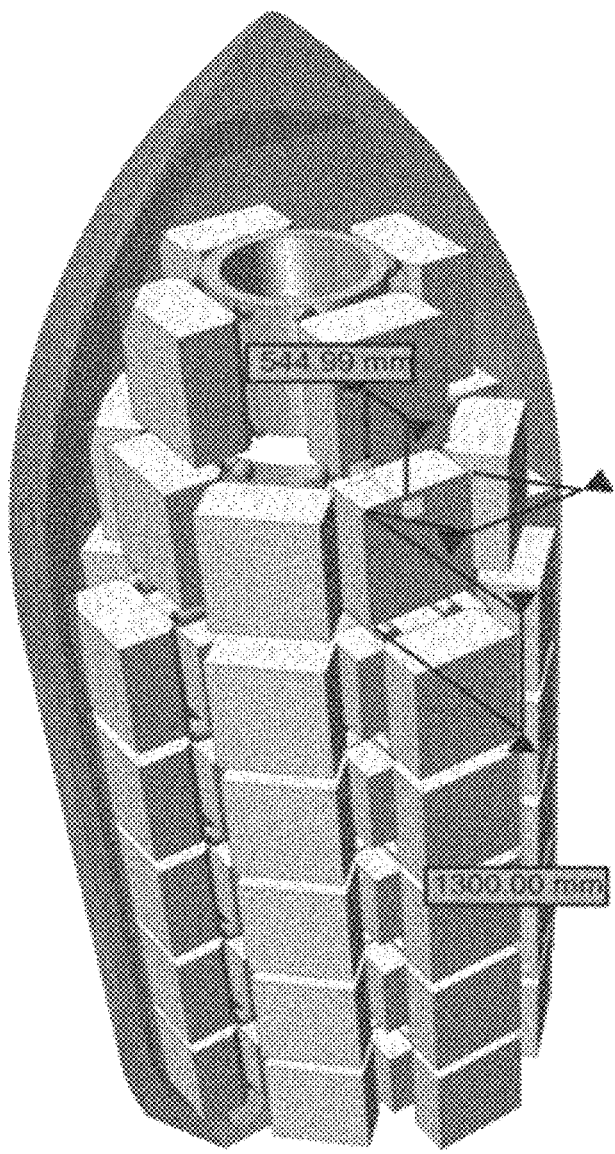
FIG. 1, described above, shows an assembly of spacecraft under cover according to the prior art.
Figure 2:
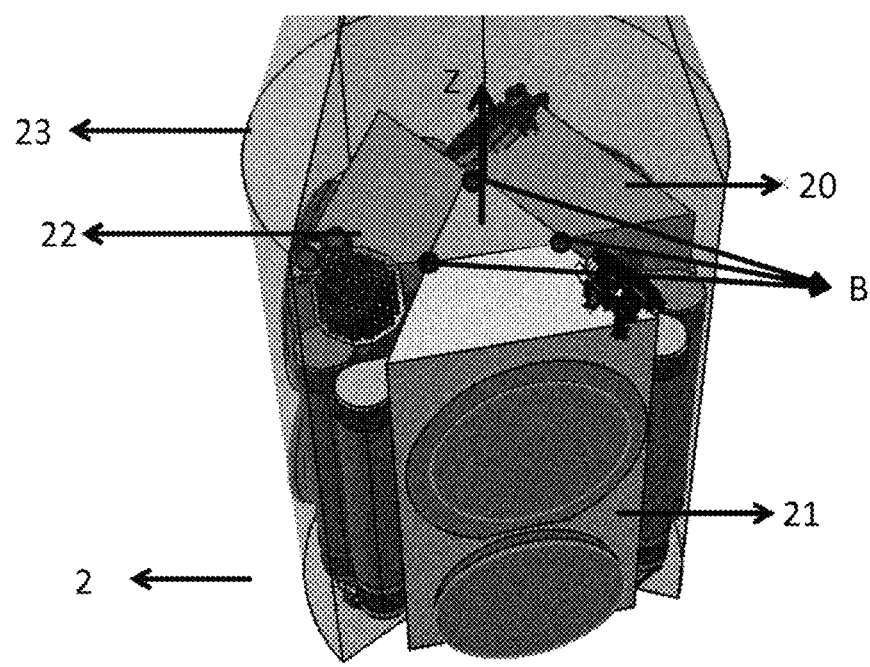
FIG. 2 shows an overall view of the assembly of spacecraft according to the invention.

FIG. 2 shows an elevated view of an assembly 2 of spacecraft 20, 21, 22 that are intended to be fastened under the cover of a launcher during a launch phase, the cover being depicted as transparent 23. In this case, the assembly consists of three trapezoidal-section satellites. In the assembly according to the invention, the satellites are arranged about a central axis Z in a given transverse plane so as to form a layer. The central axis is an axis parallel to the longitudinal axis of the space launcher. Here, a transverse plane is any plane perpendicular to the central axis Z. The satellites are mechanically linked to one another only by their edges, along the longitudinal axis of the space launcher. More specifically, the satellites or spacecraft are arranged in such a way that a spacecraft is linked to a neighboring spacecraft of the collection by one edge by means of at least one fastener B (or fastening point) positioned on said edge, so as to mechanically hold said craft to one another. FIG. 2 shows three of these fastening points B, positioned at the apex of the edges of the neighboring satellites. Furthermore, the satellites are mechanically linked to the launcher by an interface part termed satellites-launcher adaptor (24, shown in FIG. 3) that is similar to that depicted schematically in FIG. 4 and comprises fastening points (or feet) connecting the satellites to this part. The interface launcher being typically circular, the satellites-launcher adaptor generally comprises a circular portion in order to be fastened to the launcher. In the embodiment of FIG. 2, satellite/satellite and satellite/launcher fasteners are pyrotechnic bolts. This type of fastener has the advantage of making it easier to control the release sequence of the grouped/separate spacecraft. These fasteners therefore additionally make it possible for the satellites to be released with respect to one another during the release sequence. Alternatively, in another embodiment, the one or more fasteners B are electromechanical coils, shape-memory alloys, paraffin actuators or other remote-activatable detachable linking mechanisms.

The assembly according to the invention does not use a distributor to hold the spacecraft on the launcher during launch. The role of mechanically holding along the longitudinal axis of the launcher, which was usually performed by a structural distributor, is in this case performed by the connections between the edges of the satellites along the same axis, in this case by pyrotechnic bolts. A structural distributor is to be understood in this case as a structural element that has very high mechanical rigidity and that makes it possible to withstand the forces between the launcher and each of the satellites and between the satellites themselves. Thus, this solution permits a considerable gain in terms of storage volume and in terms of launchable payload. This makes it possible to modify the structure of the satellites in order to make the most of this space and of this available mass in order to load more payload, which represents the value of the satellites. Furthermore, not installing a distributor makes it possible to reduce costs and simplifies the arranging method. The payload saving thanks to this assembly is estimated at 5 to 7% of the total launched payload (that is to say approximately 50% of the mass of a conventional distributor). The arrangement shown in FIG. 2 is referred to as a "trapezium" since it consists of trapezoidal-section satellites. In another embodiment the satellites are rectangular-section. However, the use of trapezoidal-section satellites permits greater use of the space that is made available by the absence of a distributor, compared to rectangular-section satellites. This use will therefore be preferred.

The dynamic behavior of the assembly must conform to the launch authorities' requirements. More particularly, the frequencies of the first oscillation modes in a vertical and longitudinal direction must be greater than limit values that depend on the launcher and are of the order of several Hz or tens of Hz. Numerical simulations have made it possible to show that, in the embodiment of FIG. 2, the first transverse and longitudinal frequency have values in accordance with specifications.

Figure 3:
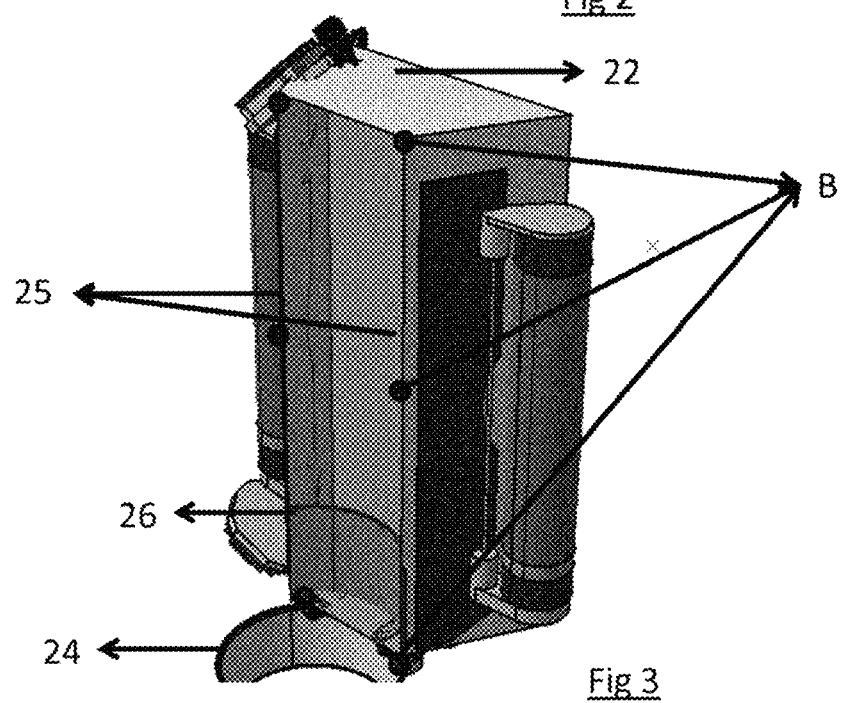
FIG. 3 shows a view of a spacecraft.

The rigid assembly formed by the three trapezoidal-section satellites and the satellites-launcher adaptor is located at the center of the launcher cover. FIG. 3 shows an isolated elevation view of the trapezoidal-section satellite 22 alone, located on the satellites-launcher adaptor 24. The edges 25 of the satellite 22 are those which, when secured to the others of the neighboring satellites 20 and 21 (shown in FIG. 2) by fasteners B, serve to hold the satellites to one another and make it possible to release these satellites. FIG. 3 shows the fasteners B which are located on the edges 25 and distributed along the latter. In the example of FIG. 3, provided by way of non-limiting example, the link between two neighboring satellites is established by two fasteners B located along the edges 25 while the satellite is linked to the launcher adaptor by means of two fasteners B.

In the embodiment of FIGS. 2 and 3, the satellites have a cylindrical reinforcement 26 located at the base of the structure of the satellites, in the extension of the fastening to the satellites-launcher adaptor 24, serving to provide additional rigidity and retention of the satellites to the satellites-launcher adaptor. In another embodiment, this cylindrical reinforcement is not installed in the structure of the satellites.

Figure 4:
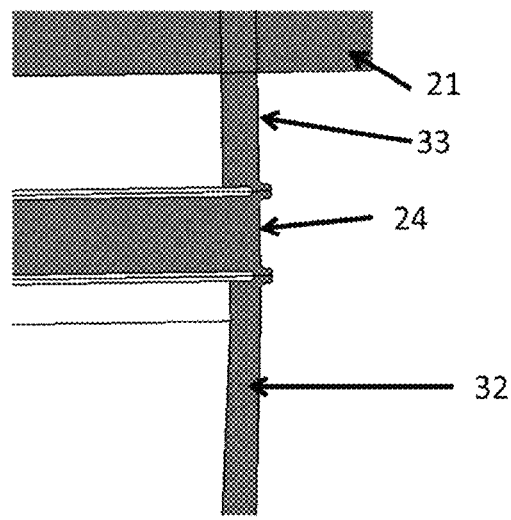
FIG. 4 shows a detail view of a the assembly of spacecraft according to one embodiment of the invention.

In another embodiment, the satellites are secured to one another in the same way as the assembly shown in FIG. 2, but are directly linked (without a satellites-launcher adaptor 24) to the launcher by a strap for example, thus providing additional support with respect to one another. In this case, the satellites are fastened to the circular perimeter of the launcher interface. In another embodiment, the number of satellites which make up the assembly can be other than three, both in the embodiment with a satellites-launcher adaptor and in the embodiment with direct fastening to the launcher. FIG. 4 is a plane view of the assembly according to the invention of a satellite and of the satellites-launcher adaptor interface part 24. This part links the launcher 32 to the three satellites (in this case only one satellite 21 is shown) by a fastening foot 33. In this embodiment, the satellites-launcher adaptor is a rigid cylindrical metallic part located directly below the satellites and between the satellites and the launcher. In another embodiment, the satellites-launcher adaptor is a part whose upper portion (on the satellites side) is a simple planar rigid plate that serves to link to the satellites, and whose lower portion (on the launcher side) is circular or conical that serves to link to the launcher. In the embodiment of FIG. 4, the satellites-launcher adaptor is a part that is shared by the three satellites. In another embodiment, this interface part is adapted to the number and to the structure of the spacecraft that are to be assembled.

Figure 5:
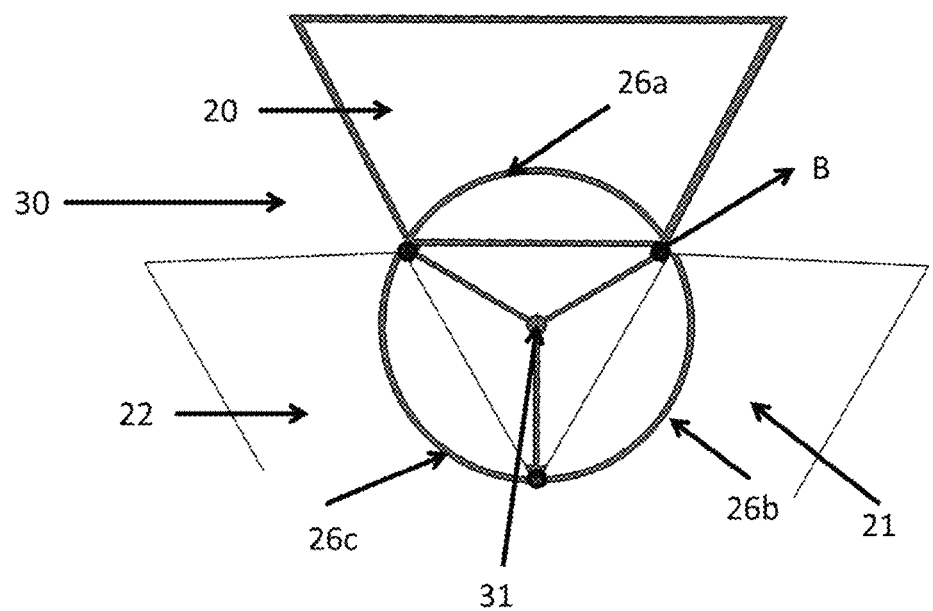
FIG. 5 shows a simplified view in section of a the assembly of spacecraft according to one embodiment of the invention.

FIG. 5 shows a schematic view in section of the assembly of spacecraft according to the same embodiment as that of FIG. 4. Once again, the structure of the satellites is trapezoidal in order to optimize the space freed up by the absence of a distributor. The three satellites 20, 21, 22 are linked by their edges by fasteners B and the reinforcements 26a, 26b, 26c in each satellite are thirds of cylinders serving to provide additional rigidity and holding of the satellites to the satellites-launcher adaptor. The fasteners B are located at the apex of the edges of the neighboring satellites of a given layer and serve to secure the satellites to one another. Furthermore, a central mast 31 which, unlike a conventional distributor, has no structural purpose and can therefore be much more lightweight, is installed at the center of the assembly and is connected to all the satellites. This mast is connected to all the fastening points fastening the satellites to one another and those fastening the satellites to the satellites-launcher adaptor. This mast is a simple non-mechanical interface, which does not hold the satellites to one another or to the launcher but which comprises the device for releasing the spacecraft. The ends of this mast are pyrotechnic charges by means of which, at the desired moment, the satellites can be made to separate from one another and from the launcher. In the embodiment of this figure, the fastening points fastening the satellites to one another, and those fastening the satellites to the satellites-launcher adaptor, are pyrotechnic bolts and the mast serves to control the explosion of these bolts. This non-structural mast therefore serves to control the sequence of release of the satellites. It is possible to release multiple satellites in a grouped manner, or to release them separately one by one.

Figure 6:
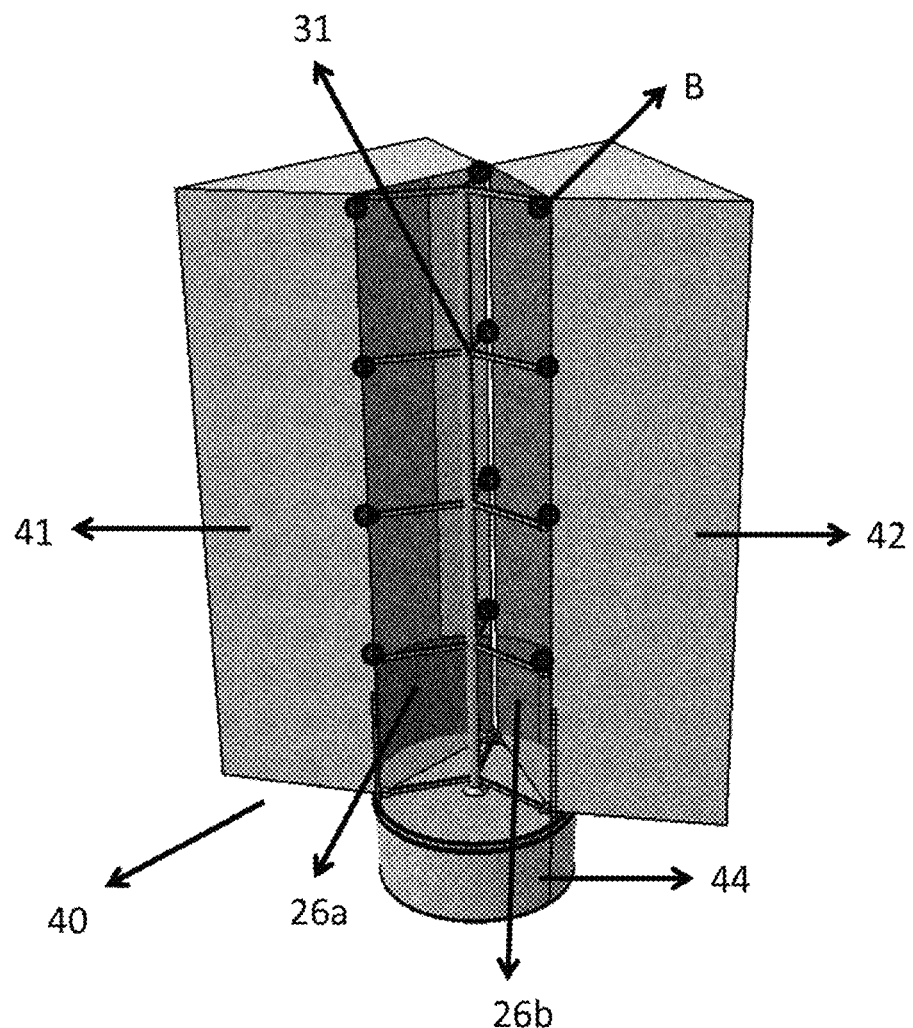
FIG. 6 shows an assembly of spacecraft according to one embodiment of the invention.

FIG. 6 shows an assembly 40 of three "trapezium" satellites 41, 42, 43—one satellite 43 is not shown for reasons of visibility—linked to the launcher by a cylindrical satellites-launcher adaptor 44 with a non-structural central mast 31 serving as an interface shared by the three satellites comprising a device for releasing the spacecraft. In the embodiment of FIG. 6, the link between the neighboring satellites is established at 4 fastening points using pyrotechnic bolts, and the link between the satellites and the satellites-launcher adaptor is established using two fastening points (in this case also pyrotechnic bolts). Furthermore, as in the embodiment of FIG. 3 the structure of the satellites comprises two cylinder thirds 26a, 26b which serve to promote the transition of forces between satellites and satellites-launcher adaptor. In another embodiment, the number of links between satellites, and between satellites and satellites-launcher adaptor, can be different from that of the embodiment of FIG. 6.

In another embodiment, the release device does not consist of pyrotechnic bolts but of electromechanical coils, shape-memory alloys, paraffin actuators or other remote-activatable detachable connection mechanisms.

In another embodiment, the non-mechanical interface common to all the spacecraft and which comprises a device for releasing the spacecraft is not a mast but consists of cables connected to one another and fastened at the satellites-launcher adaptor and linking all the fastening points for fastening the satellites to one another and for fastening the satellites to the satellites-launcher adaptor. The advantage of a mast is that it is less likely to move during launch.

Another embodiment involves creating stacks, along the launcher longitudinal axis, of multiple layers of collections of multiple spacecraft linked to one another only along the longitudinal axis of the launcher, without the use of a structural distributor and linked to the interface of the launcher in a transverse plane of the launcher. This assembly has the advantage of being able to create N stacks of n satellites while controlling, for each assembly, the sequence of launch of the n satellites. In this embodiment, fastening points (pyrotechnic bolts for example) or one continuous fastening in a circular arc per satellite, in the transverse plane, will be used between each stack in order to be able to separate the stacks one by one. It is obvious that, in this case, the structure and the design of the satellites of the lower stacks will need to be adapted in order to withstand the load of the mass of the satellites stacked above.

In one embodiment, the sequence of assembling a plurality of spacecraft 20, 21, 22 under the cover of a launcher 23 comprises:
Mounting the satellites-launcher adaptor 24 on the launcher and under the cover;
  Installing the 1st collection of satellites 2, one by one, in this manner;
    Fastening a satellite to the satellites-launcher adaptor;
    then another and linking it to the already-fastened satellite according to the longitudinal axis launcher;
    Then another, and so on until all the satellites have been fastened and linked to one another along the launcher longitudinal axis so as to form a secured assembly;
Installing the non-mechanical interface 31 that is common to all the spacecraft comprising a device for releasing the craft.

In another embodiment, the assembly sequence is identical to that previously depicted but the installation of the non-mechanical interface is done after a first satellite has been fastened to the satellites-launcher adaptor.

In another embodiment, the installation of the non-mechanical interface can be done before arranging a first collection of satellites under the cover launcher (and after having linked them together along the launcher longitudinal axis).

The invention claimed is:
1. A spacecraft assembly comprising:
  at least one collection of a plurality of spacecraft configured to be fastened to a launcher during a launch phase,
  wherein the plurality of spacecraft are arranged about a central axis transverse to said central axis,
  each of the plurality of spacecraft having a plurality of edges along a longitudinal axis, and the plurality of spacecraft being arranged such that each spacecraft is linked to a neighboring spacecraft of the collection directly by a linking edge of said plurality of edges, linked by at least one fastener positioned on said linking edge, so as to mechanically hold said plurality of spacecraft to one another, and a satellites-launcher adaptor to which said plurality of spacecraft are fastened along a transverse plane.

2. The spacecraft assembly as claimed in claim 1, wherein the satellites-launcher adaptor is a part having a planar upper portion, on a spacecraft side, and a circular or conical lower portion, on a launcher side.

3. The spacecraft assembly as claimed in claim 1, wherein the satellites-launcher adaptor is a cylindrical part located below the plurality of spacecraft.

4. The spacecraft assembly as claimed in claim 1, comprising a central mast that is shared by all of the plurality of spacecraft and serves to control a sequence of release of the plurality of spacecraft.

5. The spacecraft assembly as claimed in claim 1, comprising multiple collections of spacecraft, forming layers stacked along the central axis of the launcher.

* * * * *